US010339333B2

(12) United States Patent
Shan et al.

(10) Patent No.: US 10,339,333 B2
(45) Date of Patent: Jul. 2, 2019

(54) METHOD AND APPARATUS FOR CONTROLLING APPLICATION TO ACCESS MEMORY (71) Applicant: MONTAGE TECHNOLOGY CO., LTD., Shanghai (CN)

(72) Inventors: Gang Shan, Shanghai (CN); Yi Li, Shanghai (CN); Dongjie Tang, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 121 days.

(21) Appl. No.: 15/369,831

(22) Filed: Dec. 5, 2016

(65) Prior Publication Data

US 2018/0025171 A1 Jan. 25, 2018

(30) Foreign Application Priority Data

Jul. 20, 2016 (CN) .......................... 2016 1 0573601
Jul. 25, 2016 (CN) .......................... 2016 1 0586829

(51) Int. Cl.
*G06F 21/00* (2013.01)
*G06F 21/62* (2013.01)
*G06F 21/44* (2013.01)
*G06F 21/53* (2013.01)

(52) U.S. Cl.
CPC .......... *G06F 21/6218* (2013.01); *G06F 21/44* (2013.01); *G06F 21/53* (2013.01)

(58) Field of Classification Search
CPC ....... G06F 21/6218; G06F 21/53; G06F 21/44
See application file for complete search history.

(56) References Cited

U.S. PATENT DOCUMENTS

| 2009/0083520 | A1* | 3/2009 | Kanemura | G06F 12/1458 712/43 |
| 2009/0217385 | A1* | 8/2009 | Teow | G06F 21/604 726/27 |
| 2017/0010982 | A1* | 1/2017 | Avanzi | G06F 12/1408 |
| 2017/0168963 | A1* | 6/2017 | Jaeger | G06F 12/1475 |
| 2017/0235941 | A1* | 8/2017 | Kim | G06F 21/44 726/19 |

FOREIGN PATENT DOCUMENTS

CN 105447406 A 3/2016

* cited by examiner

*Primary Examiner* — Tri M Tran
(74) *Attorney, Agent, or Firm* — Jun He Law Offices P.C.; James J. Zhu (57) ABSTRACT A method for controlling an application to access a memory includes: receiving a first access request provided by the application and having a first access key; verifying the first access key; generating a second access key for the application if the verification of the first access key is successful; storing the second access key and providing the second access key to the application; receiving a second access request provided by the application and having a target address and a second access key; identifying whether the target address is within a reference address space indicative of a preset storage location of the memory, and verifying the second access key; generating an access control command according to an identification result of whether the target address is within the reference address space and a verification result of the second access key received from the application so as to restrict or permit the application to access the memory.

24 Claims, 4 Drawing Sheets

Figure 5

METHOD AND APPARATUS FOR CONTROLLING APPLICATION TO ACCESS MEMORY

CROSS REFERENCE TO RELATED APPLICATIONS

This application claims priority to Chinese Patent Application No. 201610573601.0 filed on Jul. 20, 2016 and Chinese Patent Application No. 201610586829.3 filed on Jul. 25, 2016, the entire content of each which is incorporated herein by reference.

BACKGROUND OF THE INVENTION

1. Technical Field

The disclosure generally relates to computer technology, and more particular to a method and an apparatus for controlling an application to access a memory.

2. Related Art

Rapid development of the Internet technology enables interconnection and communication of network devices such as computers, mobile terminals, etc. People can obtain information through the interconnected devices easily. However, the networked devices may be easily attacked by external unauthorized devices, either accidentally or maliciously, thereby causing damage, disclosure or tampering of internal data. Consequently, data and information security problem becomes more and more important.

Thus, there is a need to improve conventional computers or other electronic devices to improve their data security.

SUMMARY

One objective of the disclosure is to improve conventional computers or electronic devices to improve their data security and system stability.

In an aspect of the disclosure, there is provided an apparatus for controlling an application to access a memory. The apparatus comprises an access controller configured to receive and verify a first access request provided by the application and having a first access key, the access controller being further configured to receive a second access request provided by the application and having a target address and a second access key, identify whether the target address is within a reference address space indicative of a preset storage location of the memory, and verify the second access key; and a key generator configured to generate the second access key for the application if the verification of the first access key is successful, and provide the second access key to the application, wherein the access controller is further configured to receive the second access key from the key generator and store the second access key for verifying the second access key received from the application; and generate an access control command according to an identification result of whether the target address is within the reference address space and a verification result of the second access key received from the application so as to restrict or permit the application to access the memory.

In another aspect of the disclosure, there is also provided a method for controlling an application access a memory. The method comprises: receiving a first access request provided by the application and having a first access key; verifying the first access key; generating a second access key for the application if the verification of the first access key is successful; storing the second access key and providing the second access key to the application; receiving a second access request provided by the application and having a target address and the second access key; identifying whether the target address is within a reference address space indicative of a preset storage location of the memory, and verifying the second access key received from the application using the stored second access key; and generating an access control command according to an identification result of whether the target address is within the reference address space and a verification result of the second access key received from the application so as to restrict or permit the application to access the memory.

In another aspect of the disclosure, there is also provided a method for controlling an application to access a memory. The method includes: receiving a first configuration request provided by the application and having a first configuration key; verifying the first configuration key; generating a second configuration key for the application if the verification of the first configuration key is successful; storing the second configuration key and providing the second configuration key to the application; receiving a second configuration request provided by the application, wherein the second configuration request comprises access configuration rule data and the second configuration key, and the access configuration rule data is used to define an access authority of a reference address space indicative of a preset storage location of the memory; verifying the second configuration key received from the application by using the stored second configuration key; and storing the access configuration rule data for security access to the memory, if the verification of the second configuration key received from the application is successful.

In another aspect of the disclosure, there is also provided a method for controlling an application to access a memory. The method comprises transmitting a first access request having a first access key to the memory; receiving a second access key; transmitting a second access request having a target address and the second access key to the memory; and accessing the memory.

The foregoing has outlined, rather broadly, features of the present disclosure. Additional features of the present disclosure will be described, hereinafter, which form the subject of the claims of the present disclosure. It should be appreciated by those skilled in the art that the conception and specific embodiments disclosed herein may be readily utilized as a basis for modifying or designing other structures or processes for carrying out the objectives of the present disclosure. It should also be realized by those skilled in the art that such equivalent constructions do not depart from the spirit and scope of the present disclosure as set forth in the appended claims.

BRIEF DESCRIPTION OF THE DRAWINGS

The aforementioned features and other features of the present disclosure will be further described in the following paragraphs by referring to the accompanying drawings and the appended claims. It will be understood that, these accompanying drawings merely illustrate certain embodiments in accordance with the present disclosure and should not be considered as limitation to the scope of the present disclosure. Unless otherwise specified, the accompanying drawings need not be proportional, and similar reference characters generally denote similar elements.

DETAILED DESCRIPTION OF THE PREFERRED EMBODIMENTS

The following detailed description refers to the accompanying drawings as a part of the present disclosure. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without deviating from the spirit and subject of the disclosure. It should be understood that, the various aspects of the disclosure described and graphically presented herein may be arranged, replaced, combined, divided and designed in many different configurations, and these different configurations are implicitly included in the disclosure.

Figure 1:
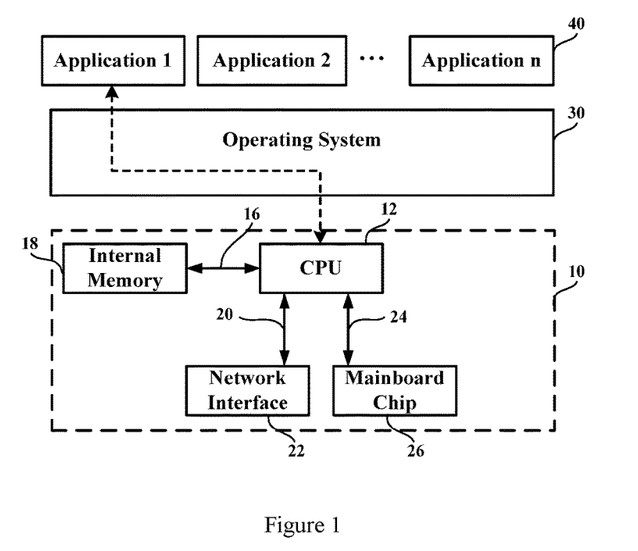
FIG. 1 shows a block diagram of a conventional computer system architecture.

The inventors of the disclosure have found that a memory interface is the key interface of a system architecture for a computer system, a mobile terminal or other smart electronic devices. FIG. 1 shows a block diagram of a conventional computer system. As shown in FIG. 1, the computer system (e.g. a server) includes a hardware system 10, wherein the hardware system 10 has a central processing unit (CPU) 12 and an internal memory 18 which are coupled to each other via a memory interface 16 (e.g. DDR3 or DDR4 interface, etc.). Moreover, the CPU 12 may be coupled to a network interface 22, e.g., Ethernet interface, via a PCI Express (PCIE) interface 20 (and further to the Internet), and coupled to a mainboard chip 26 via a direct media interface (DMI) 24.

The computer system further includes an operating system 30 (e.g., Linux, Window, or other operating systems), which is executed on the hardware system 10 and used to manage and control the hardware system 10 and software resources (e.g., applications 40). During normal operation of the computer system, various applications 40 may run on the operating system 30. The CPU 12 executes the applications 40 compiled and stored in form of machine code, and writes data into or reads data from the internal memory 18.

In the computer system shown in FIG. 1, data access operations to data stored in the internal memory 18 generally requires the CPU 12 to access the internal memory 18 via the memory interface 16. The inventors have found that, an access control mechanism can be configured in the memory interface 16 to restrict the data access to the internal memory 18 by an access request (e.g., read, write or other requests) from the applications 40 executed by the CPU 12, thereby avoiding unauthorized invocation or modification to data stored within the internal memory 18. The access request is from the CPU 12 and provided by the applications 40 executed by the CPU 12.

Based on the above inventive concept, the present disclosure provides a method and an apparatus to restrict unauthorized access to the memory by applications by controlling the data access between the CPU and the memory. The method and the apparatus use both software means and hardware means for security verification of the data access, and improve data access security using a multiple-key verification setting.

Figure 2:
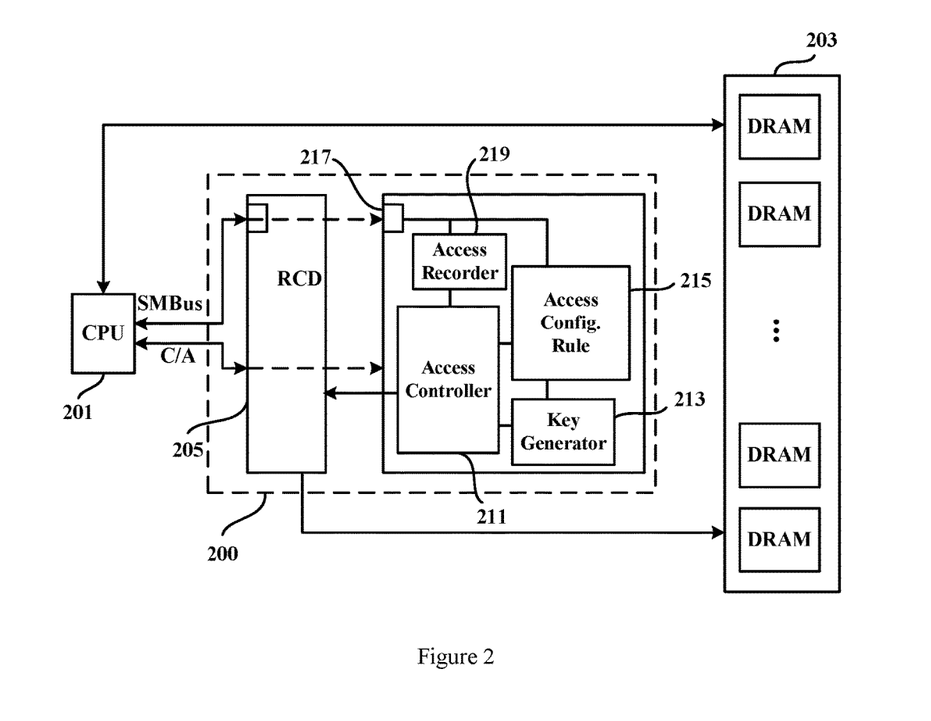
FIG. 2 shows an apparatus 200 for controlling an application to access a memory according to an embodiment of the application.

FIG. 2 shows an apparatus 200 for controlling an application to access a memory according to an embodiment of the disclosure. In some embodiments, the apparatus 200 can be integrated within the memory, functioning as a part of a memory interface for the memory.

As shown in FIG. 2, the apparatus 200 is coupled between a CPU 201 and a memory module 203 of the memory. The apparatus 200 provides a specific security access mechanism which controls data exchange between the CPU 201 and the memory module 203. The CPU 201 can execute one or more applications, and generate corresponding access requests for accessing the memory module 203, such as the write request or read request, based on codes or commands of the applications.

In the embodiment shown in FIG. 2, the memory is shown as a memory module 203, which may be an internal memory in accordance with the JEDEC Double Date Rate (DDR) Synchronous Dynamic Random Access Memory (SDRAM) standard, such as the "JEDEC DDR4" register standard, or other memory standards including JEDEC DDR1, DDR2, DDR3, DDR4 standard or the like. In addition, the memory module 203 may be other internal memories, such as single data rate SDRAM or RAMBUS memory. It should be appreciated that the memory module 203 herein may include a single memory chip or multiple memory chips.

In some embodiments, the apparatus 200 may include a register clock driver (RCD) 205. The RCD 205 is coupled to the CPU 201 through a command/address (C/A) channel, so as to receive a command/address signal (C/A signal) from the CPU 201. The access request provided by the application is transmitted to the RCD 205 in form of the C/A signal. For the memory system in accordance with the DDR4 standard, the C/A channel may include pins A0-A17, pins BG0-BG1, pins BA0-BA1 and pins CS_n and ACT_n. Specifically, the pins BG0-BG1 are used to determine which memory bank group in the memory module 203 is selected to be accessed, e.g. being written or read. The pins BA0-BA1 are used to determine which memory bank in the memory bank group is selected to be accessed, and the pins A0-A17 are used to address and determine which memory unit in a selected memory bank is to be accessed. The pin CS_n is used for rank selection on systems with multiple ranks. The pin ACT_n is used to define the activation commands entered along with CS_n. Moreover, data inputs into the three pins A16 (RAS_n), A15 (CAS_n) and A14 (WE_n) are used to determine an operation type of the access request provided, such as a read command, a write command or other predefined access commands. Therefore, the access request may include a target address indicative of one or more storage locations of the memory module 203 to be accessed by the application. Moreover, the access request may further include an operation type of the access request. The specific definition of the access request or command, which can be transmitted in form of the C/A signal, can be referred to the specific memory standard (e.g., JEDEC DDR4 SDRAM standard) used by the memory module 203, which is not elaborated herein.

In conventional operations, the RCD 205 may process the received C/A signal, so as to perform normal data exchange between the CPU 201 and the memory module 203 in response to the C/A signal. However, in some unconventional operations, namely, when the security access mechanism is activated, a module for controlling security access of the apparatus 200 may provide an access control command to the RCD 205. The RCD 205 may then restrict or allow the data exchange between the CPU 201 and the memory module 203 based on the access control command. In practice, the data exchange between the CPU 201 and the memory module 203 may be based on a data buffer module (not shown). The operation of the data buffer module can be referred to the mechanism of the conventional memories, which is not elaborated herein.

Specifically, the apparatus 200 may include an access controller 211, which is also coupled to the C/A channel to receive the access request in form of the C/A signal from the CPU 201. Besides the target address and the operation type, the access request may further include an access key, which can be transmitted through unused pins of the C/A channel. For example, for the memory system in accordance with the DDR4 standard, a portion of the pins A0-A17 (e.g., A0-A11) of the C/A channel may be used to transmit the target address, and accordingly, idle or preserved pins of the C/A channel which are not used to transmit the target address or other information (e.g., the operation type), such as the pins A12-A17, can be used to transmit the access key.

Correspondingly, the access controller 211 may extract the target address from the access request, and identify whether the target address is within a reference address space indicative of certain preset storage location of the memory module 203. For example, the target address may be compared with the reference address space bit by bit. The reference address space may be certain space of the memory module 203 which is predefined by an administrator or provider of the computer system for data security reason or other reasons, and data access to the storage location of the reference address space by applications is restricted. For example, the reference address space may be a space for storing instructions in the memory module 203. If the target address contained in the access request is within the reference address space, the apparatus 200 may activate certain security access mechanism to verify the access request, for example, by verifying the access key and/or other factors, so as to determine whether the access request is authorized.

In order to monitor the target address and verify the access key, the apparatus may further include an access configuration rule 215. For example, the access configuration rule 215 may be a small capacity memory having a preset capacity, such as a register or a firmware, and specific information or data (e.g., location information) relevant to the reference address space can be stored in the access configuration rule 215. In some embodiments, a local access key for verifying the access key of the access request can also be stored in the access configuration rule 215. The access controller 211 may be coupled to the access configuration rule 215, so as to read the access configuration rule data for access control. In some embodiments, the access configuration rule 215 may include one or more access configuration rule data, each including a start address and/or an end address of certain reference address space (in case of multiple access configuration rule data). Optionally, each access configuration rule data may further include an access authority of the reference address space.

In some embodiments, the apparatus 200 may further include a configuration interface 217, which is coupled to the CPU 201 via a system management access bus (SMBus) rather than the C/A channel. As the SMBus is separated from the C/A channel, an independent access authority may be set for the configuration interface 217. In some preferred embodiments, the access configuration rule 215 may be coupled to the configuration interface 217, such that the administrator of the computer system may initialize, modify, replace and/or set data of the access configuration rule 215 via the configuration interface 217, which will be elaborated below. In some embodiments, the configuration interface 217 may be coupled to the CPU 201 via an I²C (Inter-Integrated Circuit) bus, that is, the SMBus can be replaced by the I²C bus. In some alternative embodiments, the data of the access configuration rule 215 may be set via the C/A channel.

The apparatus 200 may further include a key generator 213, which can generate an access key dynamically when the CPU 201 is accessing the memory module 203. The key generator 213 may be coupled to the access configuration rule 215 and/or the access controller 211, so as to provide the generated access key to these modules. For example, the access key generated by the key generator 213 may be stored in the access configuration rule 215, functioning as the local access key for verifying the access key provided by the external access request. Alternatively, the access key may be transmitted to the access controller 211 and stored therein, functioning as the local access key for verifying the access key provided by the external access request.

Figure 3:
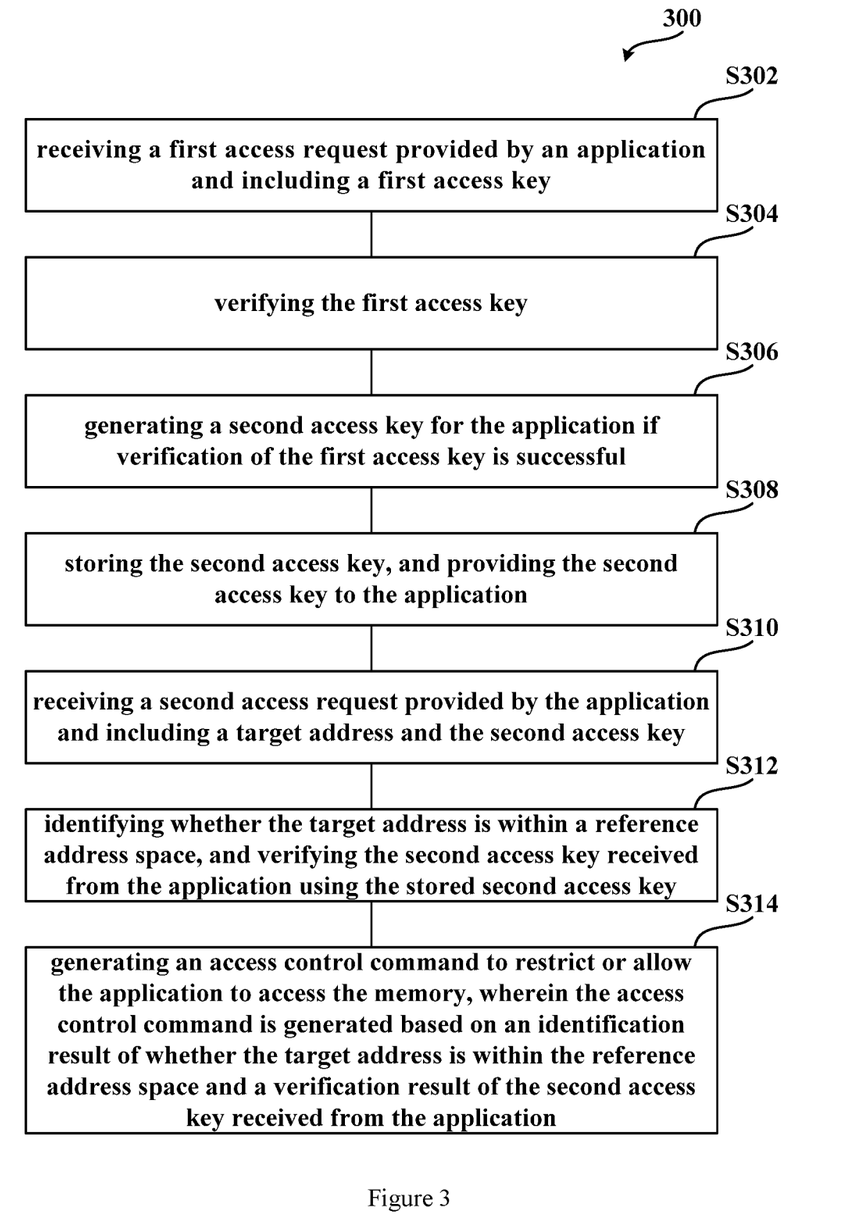
FIG. 3 shows a method 300 for controlling an application to access a memory according to an embodiment of the application.

FIG. 3 shows a method 300 for controlling an application to access a memory according to an embodiment of the disclosure. In practice, the method 300 can be implemented by the apparatus 200 shown in FIG. 2, so as to realize the access control of the memory module. In order to improve data access security, the method 300 uses a multiple-stage security verification procedure. Hereinafter, the method 300 will be elaborated with reference to FIGS. 2 and 3.

First, in step S302, the access controller 211 receives a first access request from the CPU 201 via a C/A channel, and the first access request is provided by an application executed by the CPU 201. The first access request includes a first access key. Moreover, in some embodiments, the first access request or other access requests may further include predefined access command(s). As the RCD 205 is also coupled to the C/A channel, the RCD 205 may also receive the first access request and other subsequent access requests. In some cases, the first access request may not include operation instructions for performing read, write or other operations on the memory module 203, and accordingly the RCD 205 may not act to respond to the first access request.

Next, in step S304, the access controller 211 verifies the first access key.

After receiving the first access key, the access controller 211 verifies the first access key contained in the first access request using a local access key stored in the access controller 211. If the verification of the first access key has failed, namely, the first access key does not match with the local access key stored in the access controller 211, the first access request may be determined as an unauthorized access request which doesn't have authority to the memory module 203. In this case, the access controller 211 may generate an access control command instructing the RCD 205 to prohibit or limit subsequent data access by the application. The access controller 211 then provides the generated access control command to the RCD 205. Based on the access control command received, the RCD 205 will not access data stored in the memory module 203.

In some cases, the first access key provided by the application and the local access key in the access controller 211 for verifying the first access key are preset keys. For example, the first access key and the local access key are provided by the administrator of the computer system to a designer or a user of the application, and further added into the application. In other cases, the access controller 211 may include a plurality of local access keys, which are used to verify different first access keys contained in different first access requests provided by various applications, respectively. In order to identify the right local access key from the plurality of local access keys, the first access request may further include a key identifier, which may be, for example, an identification symbol of the local access key or a storage location of the local access key. In this way, the access controller 211 can obtain the right local access key for verifying the first access key based on the key identifier.

However, if the verification of the first access key performed by the access controller 211 is successful, namely, the first access key matches with the local access key, the access controller 211 may instruct the key generator 213 to generate a second access key for the application, as is shown in step S306. The key generator 213 may generate the second access key based on a preset key generation mechanism. For example, the key generator 213 may generate the second access key based on any of various conventional random key generation algorithms. The key generator 213 may transmit the generated second access key to the access controller 211 and/or the access configuration rule 215. It can be seen that the second access key is dynamically generated when the application is accessing the memory module 203, rather than predetermined, and thus the security of the second access key is high.

Next, in step S308, the access controller 211 may transmit the second access key to the CPU 201, such that the application providing the first access request can obtain the second access key. Correspondingly, the application may add the second access key into a second access request for access verification, wherein the second access request is generated and transmitted to the memory module in subsequent steps. In another aspect, the second access key generated by the key generator 213 is also provided to the access configuration rule 215 and stored therein. The access controller 211 may read the access configuration rule 215 to verify the subsequent access requests provided by the application. Alternatively, the second access key may be directly stored in the access controller 211.

After that, in step S310, the access controller 211 receives the second access request provided by the application, wherein the second access request includes a target address and the second access key.

Next, in step S312, the access controller 211 identifies whether the target address is within a reference address space indicative of a preset storage location of the memory module, and verifies the second access key received from the application based on the second access key stored in step S308. It should be understood that, as the application receives the second access key provided by the apparatus 200 in step S308, and adds the second access key into the second access request, the second access key contained in the second access request received in step S310 should be the same as the second access key stored in the apparatus 200. However, if the second access key provided by the application is different from the second access key stored in the apparatus 200, it indicates that the access request from the application may be unauthorized.

After that, in step S314, the access controller 211 generates an access control command based on an identification result of whether the target address is within the reference address space and a verification result of the second access key received from the application, so as to restrict or allow the application to access the memory module 203.

Specifically, if the target address is not within the reference address space, then the access controller 211 may generate an access control command to allow the application to perform subsequent data access operation, and transmit the access control command to the RCD 205. The RCD 205 may control the application to access the memory module 203 based on the access control command. If the access controller 211 identifies that the target address is within the reference address space, but the verification of the second access key received from the application has failed, the access controller 211 may generate an access control command to prohibit the application to perform subsequent data access operation, and transmit the access control command to the RCD 205.

If the target address is within the reference address space, and the verification of the second access key received from the application is successful, that is, the second access key received from the application matches with the second access key stored in the access configuration rule 215 and/or access controller 211, the access controller 211 may generate an access control command to allow subsequent data access operation, and transmit the access control command to the RCD 205. The RCD 205 may perform the second access request based on the access control command, so as to perform read operation, write operation or both on the memory module 203.

Similarly, after the apparatus 200 has responded to the second access request, the application may provide subsequent access requests based on actual needs, for example, a third access request, a fourth access request, and etc. Each of these subsequent access requests may include the second access key, which is provided by the apparatus 200 for access verification. As the second access key is dynamically generated when the application is accessing the memory module 203, other applications cannot obtain the second access key in advance, which significantly improves the security of the memory module. Moreover, different applications may be assigned with different second access keys, such that mutual interferences or errors in the data access between different applications can be avoided or at least reduced.

In some embodiments, the method 300 may further set the validity of the second access key. Specifically, a timer (not shown), which is used to time a validity time of the generated second access key, may be configured in the apparatus 200. In some embodiments, after the key generator 213 has generated the second access key, the timer would start timing the validity time of the second access key. The access controller 211 may compare the validity time of the second access key with a preset time threshold. After the validity time exceeds the preset time threshold, the second access key is set to be invalid. In this case, the access controller 211 may stop using the second access key for verification. Correspondingly, after the second access key is set to be invalid, if the access controller 211 still receives an access request including the second access key from the application, the verification of the access request may fail, and the RCD 205 may not perform the access request. In order to perform subsequent data accesses, the application and the apparatus 200 may update the second access key by repeating the above steps S302 to S308. It can be seen that, by setting the validity time of the second access key, the security of data access to the memory module can be further improved.

As described above, after the second access key is generated by the key generator 213, the time starts timing the validity time of the second access key. Optionally, after the second access key is generated, if the apparatus 200 determines that the second access key is received by the application (for example, the application may send an acknowledgement message to the apparatus 200 to indicate the second access key has been received), the validity time may be set to zero. In other words, if the second access key is used by the application after being generated, the second access key may be deemed to be valid. Otherwise, if the apparatus 200 determines that the application hasn't received the second access key within certain time period from the generation of the second access key (for example, within the aforementioned preset time threshold), it may be deemed that the validity time of the second access key has expired, and thus the second access key may be set to be invalid. For certain applications, they may provide two consecutive access requests in a relatively long time interval, the above configuration can prevent the verification of the second access key from affecting normal operation of such applications.

In other embodiments, the validity time of the second access key may be timed from when the apparatus 200 responds to the second access request and reads the second access key stored therein. If the second access key can't be obtained from the second access request within a preset time threshold, the second access key stored locally may be set to be invalid, and the verification based on the second access key is then prohibited.

As described above, during the process of verifying the access key, it may occur that the verification of the access key fails, which is generally caused from unauthorized access from unauthorized application(s). For example, the CPU 201 may execute a Trojan program. In order to record such unauthorized accesses, the apparatus 200 may further include an access recorder 219, as is shown in FIG. 2. The access recorder 219 may be coupled to the access controller 211 and the configuration interface 217. The access recorder 219 is used to record information related to the access request if the access controller 211 determines that the verification of the first access key and/or the second access key has failed. For example, the information may include the target address contained in the access request, the time of receiving the access request or information about the application providing the access request, etc. With the configuration interface 217, data and information recorded in the access recorder 219 can be read out for further analysis and processing.

As described above, the access configuration rule 215 may include the reference address space and the access key for comparison with corresponding information in the access request. In some embodiments, the access configuration rule 215 may further include an operation authority of the data access to the memory module 203, e.g. readable-only, writable-only, readable and writable, or non-readable and non-writable, etc. Correspondingly, the access request may also include an operation type of the data access to be performed, e.g. write operation, read operation, etc. In this way, the access controller 211 may read out the operation authority set in the access configuration rule 215, and compare it with the operation type contained in the access request. If the operation type in the access request doesn't match with the operation authority set in the access configuration rule (e.g. the operation authority in the access configuration rule is readable-only, but the operation type in the access request is a write operation), then the access controller 211 may prohibit the access request to access the memory module 213, and generate a corresponding access control command and transmit it to the RCD 205.

It should be noted that, when the apparatus 200 identifies whether the target address is within the reference address space, the comparison between the two addresses is based on their respective physical addresses rather than virtual addresses. If the reference address space corresponds to a plurality of physical addresses distributed in the memory module 203, a complex comparison logic is needed to implement the comparison between the target address and the reference address space. Thus, in some preferred embodiments, the reference address space is a continuous physical address space, which helps to reduce the complexity of the comparison logic for comparing the reference address space with the target address. However, the target address contained in the access request provided by the application is generally a virtual address. Thus, after receiving the access request, the access request may be preprocessed by the operating system, so as to convent the target address from the virtual address to a physical address.

It should be also noted that, in the above embodiments, the first access request is mainly used to verify the first access key and to obtain the second access key, and thus the first access request may not include the access command, the target address or other relevant information. In some embodiments, the first access request may further include the access command and the target address. Optionally, after receiving the first access request, the apparatus 200 may verify the first access key and identify whether the target address is within the reference address space which is restricted to be accessed. In this way, the apparatus 200 can determine whether or not to continue the subsequent operations according to the identification result of whether the target address is within the reference address space and the verification result of the first access key.

Moreover, it can be appreciated that, if an access request from an application does not contain any access key and only contain a target address and an access command (i.e. a normal access request), the apparatus 200 may determine whether or not to allow the access request to access the memory module 203 according to whether the target address contained in the access request is within the reference address space. Specifically, if the target address is within the reference address space, it is determined that the security access mechanism should be activated. However, as the access request does not include the access key, the requested access to the target address in the memory module 203 is then prohibited. Conversely, if the target address is out of the reference address space, then the requested access to the target address in the memory module 203 may then be allowed, which is similar to the conventional memory modules.

As described above, the apparatus 200 includes the access configuration rule 215, which generally includes various information and parameters required for the access control, such as the reference address space, the local access key and the operation authority. The administrator of the memory module 203 can modify and configure data stored in the access configuration rule 215 via the configuration interface 217, so as to manage the access authority of the memory module 203. In order to further improve the security of the access control, when modifying and configuring the access configuration rule 215, a security mechanism similar to the method shown in FIG. 3 may be used to avoid unauthorized applications from tampering with data in the access configuration rule 215.

Figure 4:
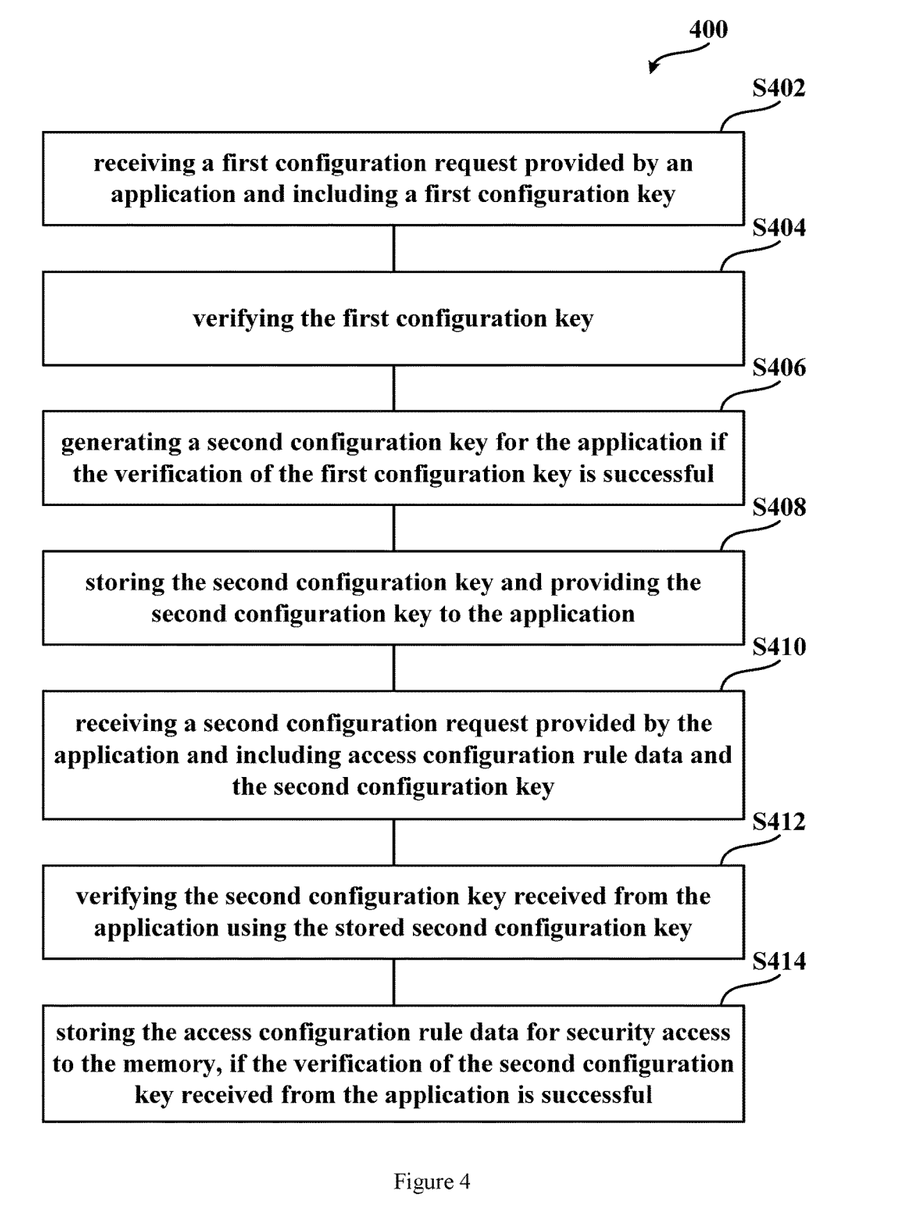
FIG. 4 shows a method 400 for controlling an application to access a memory according to an embodiment of the application.

FIG. 4 shows a method 400 for controlling an application to access a memory according to an embodiment of the present disclosure. The method 400 can be used to modify and configure the data in the access configuration rule 215, so as to manage the access authority for accessing the memory by applications. The method 400 will be further described below with reference to FIGS. 2 and 4.

As shown in FIG. 4, in step S402, the access controller 211 receives a first configuration request from the CPU 201 via the C/A channel, wherein the first configuration request includes a first configuration key. In practice, the configuration request may be defined in a manner similar to the access request. For example, the configuration request (including its configuration key) may be defined using a portion of the pins of the C/A channel. It will be appreciated that, the first configuration key may only include a first configuration key used for verification and not include any other instructions and data (such as the target address).

Next, in step S404, the access controller 211 may verify whether the first configuration key matches with a local configuration key stored in the apparatus 200. The local configuration key may be stored in the access configuration rule 215, or in the access controller 211.

If the access controller 211 determines that the verification of the first configuration key has failed, then the first configuration request may be deemed as an unauthorized configuration request which doesn't have the security configuration authority. In this case, the access controller 211 may prohibit the first configuration request to modify data in the access configuration rule 215. Conversely, if the access controller 211 determines that the verification of the first configuration is successful, then the access controller may instruct the key generator 213 to generate a second configuration key for the application, as is shown in step S406. The key generator 213 may generate the second configuration key based on a preset key generation mechanism. For example, the key generator may generate the second configuration key based on any of various conventional random key generation algorithms.

Next, in step S408, the access controller 211 may store the generated second configuration key. For example, the second configuration key may be stored in the access controller 211 or in the access configuration rule 215. Then, the access controller 211 provide the second configuration key to the CPU 201, so that the application providing the first configuration request can obtain the second configuration key. The application may add the second configuration key into a new second configuration request for configuration verification.

After that, in step S410, the access controller 211 receives the second configuration request provided by the application, and the second configuration request includes access configuration rule data and the second configuration key. The access configuration rule data is used to define an access authority to a reference address space indicative of a preset storage location of the memory module 203.

Next, in step S412, the access controller 211 may verify the second configuration key received from the application using the second configuration key stored therein.

After that, in step S414, if the verification of the second configuration key received from the application is successful, the access controller 211 may store the access configuration rule data into the access configuration rule 215. Thus, the access configuration rule 215 can be updated and modified. When the application and other applications access the memory module, the access controller 211 can manage the access to the memory module based on the updated data in the access configuration rule 215. In practice, based on the amount of the access configuration rule data, the steps S410 to S414 may be performed repeatedly, so as to store all the required access configuration rule data into the access configuration rule 215.

In some embodiments, the access configuration rule data may be transmitted to the access controller 211 via the C/A channel, and may be written into the access configuration rule 215 by the access controller 211. In some alternative embodiments, the second configuration request may be divided into two parts: a first part including the second configuration key may be transmitted to the access controller 211 via the C/A channel so that the access controller 211 can verify the second configuration key; and a second part including the access configuration rule data may be transmitted to the apparatus 200 via the SMBus channel or other channels instead of the C/A channel. The apparatus 200 may receive the access configuration rule data via the configuration interface 217, so that the access controller 211 may determine whether or not to store the access configuration rule data into the access configuration rule 215 based on the verification result of the second configuration key.

Similar to the method 300, in step S404 and step S412 of the method 400, the first/second configuration key provided by the application may be verified by the access controller 211. If the verifications of these configuration keys fail, the access controller 211 may provide information about the failed verification to the access recorder 219, so that the access recorder 219 can record such information.

As described above, the reference address space is a physical address space, and preferably, a continuous physical address space. However, the applications can only perform operations based on the virtual addresses. Therefore, when generating the access configuration rule data, a physical address space may be allocated first, and then the physical address space can be preserved as the reference address space for access control. Taking Linux system as an example, a function "malloc" may be used to allocate the physical address space, or preferably, a function "kmalloc" may be used to allocate a continuous physical address space. Afterwards, a function "remap_pfn_range" may be used to associate the address (virtual address) which the application is restricted to access with the physical address space. Accordingly, the physical address in the memory module which the application cannot access directly or cannot identify can be converted into a virtual address which can be accessed or identified. Next, the reference address space in form of the virtual address may be added into access configuration rule data, and then the access configuration rule data may be stored into the access configuration rule using the method 400 shown in FIG. 4.

Figure 5:
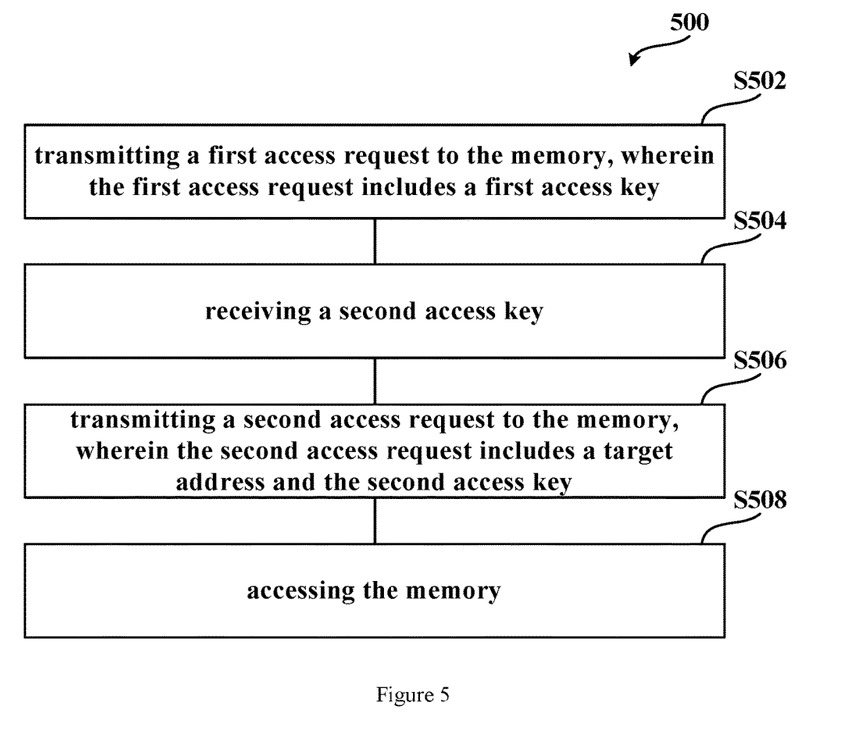
FIG. 5 shows a method 500 for controlling an application to access a memory according to an embodiment of the application.

FIG. 5 shows a method 500 for controlling an application to access a memory according an embodiment of the disclosure. The method 500 can be implemented by the CPU 201 shown in FIG. 2 executing instructions or codes of an application, so as to interact with the apparatus 200 performing the method 300 shown in FIG. 3.

As shown in FIG. 5, in step S502, the CPU 201 transmits a first access request to a memory, and the first access request includes a first access key. The apparatus 200 receives the first access request and verifies the first access key. If verification of the first access key is successful, then the apparatus 200 may transmit a second access key to the CPU 201. Correspondingly, in step S504, the CPU 201 receives the second access key. Next, in step S506, the CPU 201 adds the second access key into a second access request, and transmits the second access request to the memory. The second access request includes a target address and the second access key. After receiving the second access request, the apparatus 200 identifies whether the target address is within a reference address space indicative of a preset storage location of the memory, and verifies the second access key. If the apparatus 200 identifies that the target address is within the reference address space, and the verification of the second access key is successful, the CPU 201 may access the memory based on an access control command, such as writing data into the memory or reading data from the memory, as is shown in step S508.

Those skilled in the art may understand and implement other variations to the disclosed embodiments from a study of the drawings, the disclosure, and the appended claims. The above embodiments are presented by way of example only, and not limitation. The embodiments of the disclosure may be implemented in the form of hardware, software, or a combination thereof. Any modification, equivalent substitution, and improvement without departing from the spirit and principle of this invention should be covered in the protection scope of the invention. In the claims, the word "comprising" does not exclude other elements or steps, and the indefinite article "a" or "an" does not exclude a plurality. In disclosures according to present disclosure, one element may perform functions of several technical feature recited in claims. Any reference signs in the claims should not be construed as limiting the scope. The scope and spirit of the present disclosure is defined by the appended claims.

What is claimed is:

1. An apparatus for controlling an application to access a memory, comprising:
   an access controller, configured to receive and verify a first access request provided by the application and having a first access key, the access controller being further configured to receive a second access request provided by the application and having a target address and a second access key, identify whether the target address is within a reference address space indicative of a preset storage location of the memory, and verify the second access key; and
   a key generator, configured to generate the second access key for the application if the verification of the first access key is successful, and provide the second access key to the application,
   wherein the access controller is further configured to receive the second access key from the key generator and store the second access key for verifying the second access key received from the application; and generate an access control command according to an identification result of whether the target address is within the reference address space and a verification result of the second access key received from the application so as to restrict or permit the application to access the memory.

2. The apparatus of claim 1, wherein the reference address space is a continuous physical address space.

3. The apparatus of claim 1, further comprising:
   a register clock driver coupled to the access controller to receive the access control command, and configured to restrict or permit the application to access the memory according to the access control command.

4. The apparatus of claim 3, wherein the register clock driver is in accordance with the JEDEC DDR4 register standard.

5. The apparatus of claim 1, wherein the key generator is a random key generator.

6. The apparatus of claim 1, further comprising:
   a timer, configured to time a validity time of the generated second access key,
   wherein the access controller is further configured to stop using the second access key for verification after the validity time of the second access key exceeds a preset time threshold.

7. The apparatus of claim 1, further comprising:
   an access recorder coupled to the access controller, and configured to record information related to the first access request if the verification of the first access key has failed.

8. The apparatus of claim 1, wherein the second access request further comprises an access type of data access to the memory, and the access controller stores access authority; and
   wherein the access controller is further configured to generate the access control command according to a comparison result of whether the access type complies with the access authority, the identification result of whether the target address is within the reference address space, and the verification result of the second access key received from the application.

9. The apparatus of claim 1, wherein the first access request further comprises a key identifier, and the access controller is further configured to obtain a local access key for verifying the first access key based on the key identifier.

10. A method for controlling an application access a memory, comprising:
    receiving a first access request provided by the application and having a first access key;
    verifying the first access key;
    generating a second access key for the application if the verification of the first access key is successful;
    storing the second access key and providing the second access key to the application;
    receiving a second access request provided by the application and having a target address and the second access key;
    identifying whether the target address is within a reference address space indicative of a preset storage location of the memory, and verifying the second access key received from the application using the stored second access key; and
    generating an access control command according to an identification result of whether the target address is within the reference address space and a verification result of the second access key received from the application so as to restrict or permit the application to access the memory.

11. The method of claim 10, wherein the reference address space is a continuous physical address space.

12. The method of claim 11, wherein the target address is a virtual address, and the method further comprises:
    converting the target address to a physical address so as to compare the target address with the reference address space.

13. The method of claim 10, wherein the second access key is randomly generated.

14. The method of claim 10, further comprising:
    timing a validity time of the generated second access key; and
    stopping using the second access key for verification after the validity time of the second access key exceeds a preset time threshold.

15. The method of claim 10, further comprising:
recording information related to the first access request if the verification of the first access key has failed.

16. The method of claim 10, wherein the second access request further comprises an access type of a data access to the memory, and the step of generating an access control command further comprises:
identifying whether the access type complies with the a preset access authority; and
generating the access control command according to a comparison result of whether the access type complies with the access authority, the identification result of whether the target address is within the reference address space and the verification result of the second access key received from the application.

17. The method of claim 10, wherein the first access request further comprises a key identifier, and the method further comprises:
obtaining a local access key for verifying the first access key based on the key identifier.

18. The method of claim 10, further comprising:
transmitting the access control command to a register clock driver, wherein the register clock driver is configured to restrict or permit the application to access the memory according to the access control command.

19. A method for controlling an application to access a memory, comprising:
receiving a first configuration request provided by the application and having a first configuration key;
verifying the first configuration key;
generating a second configuration key for the application if the verification of the first configuration key is successful;
storing the second configuration key and providing the second configuration key to the application;
receiving a second configuration request provided by the application, wherein the second configuration request comprises access configuration rule data and the second configuration key, and the access configuration rule data is used to define an access authority of a reference address space indicative of a preset storage location of the memory;
verifying the second configuration key received from the application using the stored second configuration key; and
storing the access configuration rule data for security access to the memory, if the verification of the second configuration key received from the application is successful.

20. The method of claim 19, wherein the reference address space is a continuous physical address space.

21. The method of claim 19, wherein the second configuration key is randomly generated.

22. The method of claim 19, further comprising:
recording information related to the first configuration request if the verification of the first configuration key has failed.

23. The method of claim 19, wherein the access configuration rule data further comprises an access type of data access to the memory.

24. A method for controlling an application to access a memory, comprising:
transmitting a first access request having a first access key to the memory;
receiving a second access key if the first access key is successfully verified;
transmitting a second access request having a target address and the second access key to the memory; and
accessing the memory according to an identification result of whether the target address is within a reference address space indicative of a preset storage location of the memory and a verification result of the second access key, wherein accessing the memory is restricted when the target address is within the reference address space but the verification result of the second access key is failed.

* * * * *